United States Patent
Chang

(10) Patent No.: US 7,417,772 B2
(45) Date of Patent: Aug. 26, 2008

(54) VECTOR ERROR DIFFUSION

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1048 days.

(21) Appl. No.: 10/764,321

(22) Filed: Jan. 23, 2004

(65) Prior Publication Data

US 2005/0162703 A1 Jul. 28, 2005

(51) Int. Cl.
G06K 15/00 (2006.01)
(52) U.S. Cl. .................... 358/3.03; 358/1.9; 382/252; 382/253
(58) Field of Classification Search ............... 358/3.03, 358/3.04, 3.05, 1.9; 382/252, 253, 251
See application file for complete search history.

(56) References Cited

U.S. PATENT DOCUMENTS

| 5,070,413 | A |   | 12/1991 | Sullivan et al. |
| 5,561,751 | A | * | 10/1996 | Wong .......................... 345/589 |
| 5,621,545 | A | * | 4/1997 | Motta et al. ................. 358/518 |
| 5,621,546 | A |   | 4/1997 | Klassen et al. |
| 6,072,591 | A | * | 6/2000 | Harrington .................. 358/1.9 |
| 6,178,008 | B1 |   | 1/2001 | Bockman et al. |
| 6,483,606 | B1 |   | 11/2002 | Klassen et al. |
| 6,535,635 | B1 |   | 3/2003 | Klassen et al. |

FOREIGN PATENT DOCUMENTS

JP 9-307776 11/1997

* cited by examiner

*Primary Examiner*—Thomas D Lee
(74) *Attorney, Agent, or Firm*—David C. Ripma; Jon M. Dickinson; Robert D. Varitz

(57) ABSTRACT

A vector error diffusion (VED) method employable in cycles with respect to a hi-tonal color printing engine which prints bi-tonal color images in a device output color space. The method generally includes (a) acquiring input color-image data which is characterized with an input color space, (b) processing, with available pre-established VED accumulated error data, such input data to produce a VED-processed input color-image data stream, (c) from such VED-processed input color-image data stream, creating, without employing interpolation, a VED-processed output color-image data stream which is characterized by the mentioned device output color space, and which is suitable for delivery to and use by the mentioned printing engine, and (d) changing, as appropriate for the next cycle, the VED accumulated error data which will be employed in that next cycle as pre-established VED accumulated error data.

6 Claims, 1 Drawing Sheet

| | L | a | b |
|---|---|---|---|
| C | 4.6 | -18 | -53 |
| M | 38 | 75 | -23 |
| Y | 85 | -14 | 52 |
| C+M | 17 | 27 | -74 |
| C+Y | 40 | -43 | 17 |
| M+Y | 35 | 57 | 20 |
| C+M+Y | 15 | -4 | 1 |

MEASURED VALUES

| | L | a | b |
|---|---|---|---|
| C' | 99 | 0 | -1 |
| M' | 99 | 1 | 0 |
| Y' | 99 | 0 | 3 |

FICTIONAL VALUES

VECTOR ERROR DIFFUSION

BACKGROUND AND SUMMARY OF THE INVENTION

This invention pertains to an improved method for employing vector error diffusion (also referred to herein as VED) with respect to an imaging device, typically a printer, which, as is the case with many printers, operates as a bi-tonal printing engine that creates (prints) bi-tonal color images in C,M, Y,K color space. The printing output color space of such an engine is referred to herein as a device output color space. Improvement, as offered by the present invention, especially takes place in the highlight areas of an image, wherein practice of the invention significantly minimizes graininess. A preferred embodiment of, and manner of practicing, the invention are illustrated herein in a setting wherein a source color image, whose data (referred to as input color-image data) initially "resides" in R,G,B color space, is first converted to a data file in L,a,b color space (referred to herein as an input color space). This L,a,b file is then processed by the steps of the invention to effect printing by a printer which prints a resulting bi-tonal image in C,M,Y,K color space, referred to herein, as mentioned above, as a device output color space. Thus, the illustration of the invention disclosed herein is presented in a setting wherein the input and output color spaces differ. It should be understood, however, that such a differing is not a requirement of the invention. The invention, as illustrated and described herein, is discussed just in the representative context of C,M,Y device output color space, notwithstanding the fact that a C,M,Y,K output-color-space printer is employed as the illustrative printer, or printing engine. C,M,Y color space is specifically referred to herein as the "employed" device output color space.

As will become apparent, the present invention, which introduces and offers a number of unique features, facets and advantages that will now be touched upon briefly in this introductory narrative, functions in pixel-by-pixel cycles to process color images. In particular, the invention implements VED employing a specially (in accordance with the invention) generated color-value palette, or table, (also referred to herein as a palette/table) which functions somewhat in the manner of a look-up table, and which correlates input-color-space pixel values with C,M,Y device output-color-space values based upon spectrophotometric analysis of the actual printing performance of a selected printer. The palette is specially and uniquely characterized (generated) in that, among other things, it contains no values relating to white, and further, and in accordance with the invention, in a manner whereby it contains three fictional sets of color values relating to three fictional colors C', M', and Y'. These fictional C',M',Y' color values are selected (user choice enters here) to lie effectively "between" white values and the just-mentioned spectrophotometrically determined values for C, M, and Y, respectively.

Further describing this spectrophotometric practice, to prepare for implementation of the invention, the C,M,Y,K printer which is selected for use is operated to print a collection of primary C,M,Y color patches, and a collection of secondary C+M, C+Y, M+Y, and C+M+Y color patches. K is not necessarily employed, and will not be discussed herein. When this has been done, a spectrophotometer reads these color patches, and from that reading, effectively outputs the respective L,a,b pixel color values for each of the patches. These performance-measured L,a,b color values, appropriately "adjusted" to lie within a scale of values ranging from 0 to 100, which range relates proportionately to a "computer" range 0 to 255, then make up the bulk of the mentioned color-value palette. It should be understood here that while the preferred embodiment and manner of practicing the invention are described herein in a setting where the palette contains L,a,b color-space values, the palette may be constructed using any appropriate printing-device-independent color-space values.

Output colors for an output image are delivered to a selected printer (printing engine), and are printed on the basis of "look-up table employment" of the palette. The output colors are always one of the C,M,Y,K color-space primary or secondary colors. How this happens, and how the presence of the mentioned fictional values contributes to the advantages offered by the invention, will be explained below in the detailed description of the invention. It may be useful at this point in this discussion simply to say that the absence of white values in the palette, coupled with the presence of the mentioned, fictional C',M',Y' values, creates a better setting for distributions of the lighter primary-color pixels, rather than of the darker secondary-color pixels, to be employed in the definitions of highlight regions in an output, printed, color, bi-tonal image. This condition, which is uniquely established by invocation of the present invention, leads to the suppression of unwanted graininess in such image regions.

Use of the just-outlined look-up table approach conveniently enables practice of VED without requiring pixel-value interpolation. Absence of representative values for white in the table links with another unique feature of the invention which is generally described in the paragraph presented immediately below. Presence of the mentioned, fictional C',M',Y' values plays a significant role in minimizing graininess in image highlight areas through forcing selection of primary C,M,Y output colors in certain situations where, in the absence of the advantageous "intervention" interposed by the method of the present invention, darker secondary colors would be output to image highlight areas, and would create therein noticeable graininess.

Regarding the feature link just briefly mentioned above, acquired source-image pixel data, in whatever color space that data initially exists, is reviewed initially to cull out pixels which are either pure white or pure black. These pixels, where encountered, are directly sent to the printer for printing, without using any VED, and without performing any processing in the context of the palette/table.

Another special feature of the invention involves the implementation of luminance thresholding at a stage in the practice of the invention after white and black pixels have been culled, as generally described above, and also after VED processing has thereafter been applied to image data in the input color space. Where, as is specifically illustrated herein, the L,a,b color space is employed as the input color space, a threshold value, such as 245, is preferably established for L. One should understand that this luminance threshold value can be any value suitably chosen by the user, and typically will be a value which is relatively close to the value (255 normally) of pure white. The particular threshold value just mentioned is in no way a critical value, but has been found to be one which is quite practical and satisfactory for most applications. With application of luminance thresholding in accordance with the invention, any VED-processed pixel having an L value exceeding the chosen threshold value is declared to be a white pixel. All others (pixels) are sent on for comparison processing using the palette/table. The advantageous use of this L thresholding for white eliminates the need to have white represented in the palette/table values, and it contributes significantly to minimizing graininess in the finally printed, bi-tonal output image.

These and other special features and advantages that are offered by the invention will become more fully apparent as the detailed description thereof which now follows is read in conjunction with the accompanying drawings.

DESCRIPTION OF THE DRAWINGS

FIGS. 2 and 3 collectively illustrate the mentioned palette/table.

DETAILED DESCRIPTION OF THE INVENTION

Figures 1, 2, 3:
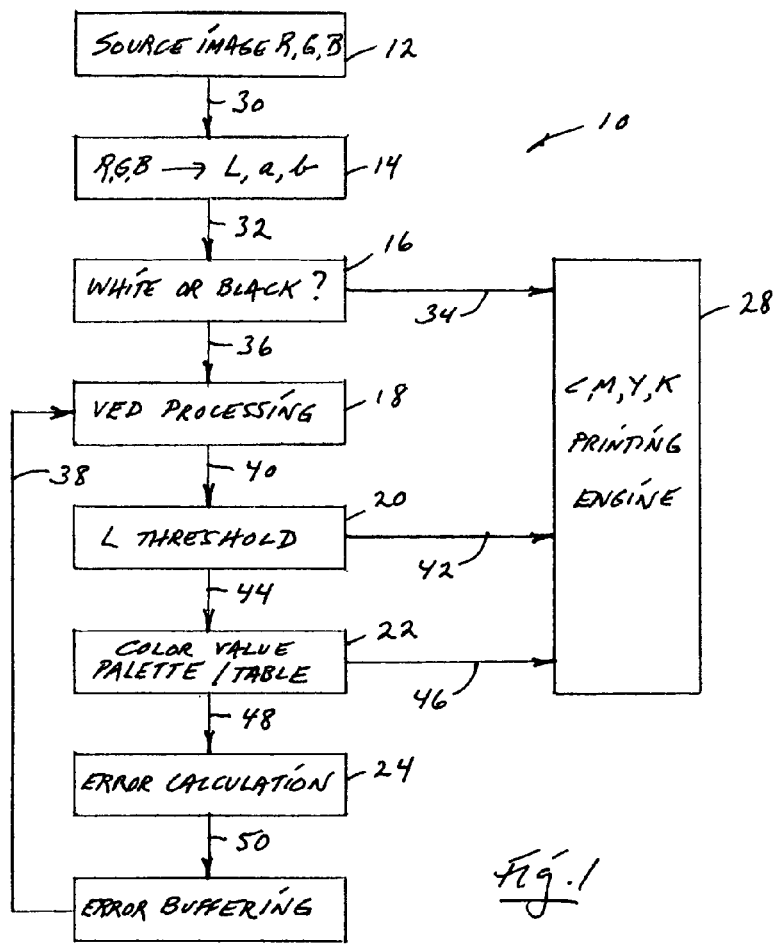
FIG. 1 is a block/schematic over-view diagram illustrating a preferred and best-mode embodiment of, and manner of practicing, the invention.
FIG. 2 is a table of typical measured L,a,b color-space values which directly characterize a selected C,M,Y,K printer's printed patches for primary colors C, M, and Y, and for secondary colors C+M, C+Y, Y+M, and C+M+Y, all of which values are for use herein in a color-value palette/table.
FIG. 3 is a table illustrating typical "fictional" L,a,b color-space values selected for use in a palette/table in collaboration with the measured L,a,b values shown in FIG. 2.

Turning now to the drawings, indicated generally at 10 in FIG. 1 is a block diagram illustrating a preferred and best mode embodiment of, and manner of practicing, the present invention. Shown in this figure are eight interconnected blocks 12, 14, 16, 18, 20, 22, 24, 26, to which and from which various single, arrow-headed lines extend, as illustrated, and as will be described below. These arrow-headed lines represent data-communication connections.

Also shown in FIG. 1 is a block 28 which represents a typical C,M,Y,K color-space printer designed to print bi-tonal color images. Effectively speaking, printer 28, which is appropriately connected (as will be further, and just generally, described) to others of the several blocks shown in FIG. 1, is capable of "printing" (a) white, (b) black, (c) primary colors C, M and Y, and (d) secondary colors C+M, C+Y, Y+M, and C+Y+M.

Block 12 represents a source color image which "resides", or more particularly whose data file contains pixel values residing, in R,G,B color space. For the purposes of illustration and discussion herein, block/image 12 will be assumed to contain, in addition to "other-color" pixels, both pure white and pure black pixels, as well as so-called highlight (bright) areas.

An arrow connection 30 connects block/image 12 to block 14, and this represents a stage of conventional image-processing, wherein block 14 functions to convert the data file for image 12 from R,G,B color space into L,a,b color space. L,a,b color space has been selected herein simply to illustrate a typical input color space for a color image to be processed in accordance with the invention.

Beginning, then, with source image 12 now converted to L,a,b color space, block 16, which is fed data from block 14 via an arrow connection 32, executes, pixel-by-pixel, an inquiry to determine whether the particular pixel being renewed is either pure white or pure black. If either of these conditions is true, that pixel is sent, via an arrow connection shown at 34, directly to printer 28.

With respect to pixels which do not meet these white/black criteria, however, processing is handed off, via an arrow connection 36, to block 18, wherein VED processing takes place. In terms specifically of what occurs in block 18, whether or not input L,a,b pixel values of a pixel presented to this block are specifically subjected to error correction, which correction may change, in either direction, a pixel's L,a,b values, depends upon prior processing history relating to the associated image. To understand this, we turn for a moment to blocks 24, 26. Blocks 24 (Error Correction) and 26 (Error Buffering) deal (a) with vector error correction calculations, (b) with running "accumulations" relating to such calculations, and (c) with appropriate buffering, for next use, of continually updated error-correction L,a,b values which are to be applied in block 18 to whatever pixel is then also presented to this block, via arrow 36 from block 16. Error corrections to be applied to a pixel's color values are supplied to block 18 from block 26 via an arrow connection 38.

If there are no corrections to be made, a pixel simply "passes through" block 18, and via an arrow connection 40 to block 20. If there are corrections to be made, appropriate changes are made to the pixels' L,a,b values—these corrections being determined by whatever specific correction information is then made available via error buffering block 26. Then, such a "corrected" pixel is sent along to block 20.

In block 20, another unique step is performed in the practice of the invention. Here, a pixel's L value is subjected to luminance "thresholding" to determine whether that value exceeds, or does not, a pre-established luminance (L) threshold value such as the one mentioned earlier herein.

As mentioned earlier, the illustrative value employed herein for thresholding is 245 on a scale from 0 to 255. If a pixel's L value exceeds this threshold L value, that pixel is then declared to be a white pixel, and is sent, via an arrow connection shown at 42, to printer 28. This category of pixel thus is not presented to the palette/table of correlation values represented by block 22. If a pixel's L value does not exceed the threshold value, the pixel is sent (i.e., its color values are sent) via an arrow connection 44 to palette/table 22.

With regard, then, to a pixel whose L,a,b values are presented to palette/table 22, a vector comparison is there performed to determine which of the color values existing in the table possess the "closest distance" (a vector difference) to the presented-pixel's color values. The well-known equation for determining this distance is:

$$\Delta E = [\Delta L^2 + \Delta a^2 + \Delta b^2]^{1/2}$$

Whichever set of table color values is found to resolve this closest-distance question determines the color of the pixel which will be output (delivered) to printer 28 via an arrow connection 46. Thus, if a C-color pixel has the determined "closest-distance"-characteristic, a C-color pixel will be so output. If a C+M color pixel has the determined closest distance, a C+M color pixel will be output to the printer, and so on.

Under circumstances where the "closest-distance" calculation points to the values established for one of the fictional C',M',Y' color-value sets, the corresponding primary color pixel will be output to the printer. Accordingly, if the "closest-distance" pixel is calculated to be a C' pixel, a C pixel will be output to the printer. Table I below describes this important concept of the invention:

TABLE I

| Closest-Distance Pixel | Output Pixel |
|---|---|
| C' | C |
| M' | M |
| Y' | Y |

This process of outputting, or delivering, to the printer a pixel having exactly the color values only, essentially, of one of the primary or secondary color pixels, as such values are contained in the palette/table, is a principal contributor to the avoidance of using the prior-art practice of pixel-value interpolation.

As a consequence of pixel outputting based upon the comparison activity that takes place in palette 22, processing is handed off, via an arrow connection 48, to block 24, wherein a related new vector error calculation is performed. This calculation is conducted in relation to the L,a,b value differences which differentiate the L,a,b values of the actual output pixel values from those of the input pixel whose values triggered the palette-22 comparison in the first place. A new vector error determination, also referred to herein as VED accumulated error data, is then stored, via a connection arrow 50, in error buffering block 26.

The following descriptive narrative further illustrates, in two examples, the above-discussed procedures for employing the color-data palette/table, and for calculating accumulated vector error for subsequent diffusion, via blocks 26, 18, to later-processed pixel-color values.

In the color-value palette/table, C has the values of 46, −18, −53. C' has the values of 99, 0, −1. If a pixel presented to this table, after vector error processing in block 18, has the value 44, −16, −49, such a pixel will have a determined "closest distance" to the C values. As a consequence, a C pixel will be output to printer 28. Outputting of this C pixel causes an "expenditure" of color values 46, −18, −53. To calculate (in block 24) the error which this expenditure creates, the "spent" color values are subtracted from "presented-pixel" color values. Thus the error which will result from this event will be −2, 2, 4. This error result will be supplied to error buffering block 26 for next use with a subsequent processed pixel.

If another vector-error-processed pixel is presented to the table having color values of 99, 0, −2, the "closest distance" set of color values resident in the table will be determined to relate to the fictional values associated with C'. Recalling that when the fictional values associated with C', M', and Y' are found to be the "closest-distance" values the corresponding primary-color set of values will be selected for outputting to the printer, here too the C-pixel values will be the ones which are output. Thus, the "spent" color values will, as in the first example, be 46, −18, −53, and the accumulated error values which will be calculated will be 53, 18, 51.

Thus the invention offers a unique method for vector error diffusion which addresses special attention to improving the characters and qualities of highlight regions in an image. The invention facets which lead to this include: (a) the practice of deflection for immediate printing each pre-processed input pixel having the color values for pure white and pure black; (b) the applying of a predetermined luminance threshold to post-VED processed pixels, whereby certain pixels with color lying within a certain range are declared to be white pixels that are then sent for printing; (c) the use of a data palette/table of values, absent white values, for the actual color pixels which a particular bi-tonal print engine will print; and (d) incorporation into this data palette/table of pre-chosen, fictional color values (as described below) C',M',Y'; and (e) the use of comparison and selection (without interpolation) of just those values presented for the primary and secondary colors in the output color space for sending to a printing engine.

Steps of the invention, performed in a setting wherein there is present a generated data palette/table (block 22) of color values that are based both upon the primary and secondary color values of the output color space (as will be actually printed by a selected printing engine), and upon a selected set of fictional output-color-space values, include, in various arrangements of cyclic, pixel-by-pixel steps: (a) acquiring input color-image data (block 14, and arrow connection 32); (b) processing this input data with pre-established VED accumulated error data to produce a VED-processed input color-image data stream (block 18, and arrow connections 36, 38); (c) creating from this input data stream, without interpolation, a VED-processed output color-image data stream (blocks 20, 22, and arrow connections 38, 42); (d) delivering the associated output color-image data stream to the selected printing engine (arrow connection 43); and (e) changing, as appropriate for the next cycle, the VED accumulated error data which will be employed in that next cycle as pre-established VED accumulated error data (blocks 24, 26, and arrow connections 44, 46, 37). The step of "creating" includes the steps of: (a) utilizing, relative to the input data stream, a threshold luminosity value, on one side of which all associated pixels are declared to be white, and on the other side of which, all pixels are declared to have a color which is other than white; and (b) employing the mentioned color-value data/palette.

Accordingly, while a preferred and best-mode embodiment of, and manner of practicing, the invention have been described herein, variations and modifications may certainly be made well within the scope of the invention.

I claim:

1. A vector error diffusion (VED) method employable in cycles with respect to a bi-tonal color printing engine which prints bi-tonal color images in a device output color space, said method, with respect to each cycle, comprising
   acquiring input color-image data which is characterized with an input color space,
   processing, with available pre-established VED accumulated error data, such input data to produce a VED-processed input color-image data stream,
   from such VED-processed input color-image data stream, and utilizing a color-value data/palette containing color values based upon device output-color-space-determined values for the primary and secondary colors which the printing engine is capable of printing, creating, without employing interpolation, a VED-processed output color-image data stream which is characterized by the mentioned device output color space, and which is suitable for delivery to and use by the mentioned printing engine, said creating including employing, in the mentioned color-value data/palette, additional, fictional color values based upon device output-color-space-selected values for arbitrary C', M' and Y' colors which lie at vector distances that are intermediate the primary C, M and Y colors and white, and
   changing, as appropriate for the next cycle, the VED accumulated error data which will be employed in that next cycle as pre-established VED accumulated error data.

2. The method of claim 1, which further comprises, at the conclusion of each cycle, delivering the associated output color-image data stream to the printing engine.

3. The method of claim 1, wherein the input, and the device output, color spaces are different.

4. The method of claim 3, wherein the input color space is L,a,b color space, and the device output color space employed is C,M,Y color space.

5. The method of claim 1, wherein said creating further includes utilizing a threshold luminosity value on one side of which all associated pixels are declared to be white, and on the other side of which, all pixels are declared to have a color which is other than white.

6. The method of claim 5, wherein said creating further includes employing, in addition to luminance-value thresholding to declare certain colors to be white, a color data palette which contains solely a set of device output-color-space pixel values based upon spectrophotometric evaluated actual output print engine performance, coupled with three fictional device output color space values which lie intermediate the primary device output-color-space values and white.

* * * * *